United States Patent [19]

Sharman et al.

[11] Patent Number: 5,045,932
[45] Date of Patent: Sep. 3, 1991

[54] METHOD AND APPARATUS FOR GENERATING A HIGH DEFINITION ELECTRONIC SIGNAL FROM A LINE SCAN OF A COLOR ORIGINAL

[75] Inventors: Richard A. Sharman, Dunstable; Roger T. Lees, Rickmansworth, both of England

[73] Assignee: Eastman Kodak Company, Rochester, N.Y.

[21] Appl. No.: 373,309

[22] Filed: Jun. 29, 1989

[51] Int. Cl.⁵ .............................................. H04N 1/46
[52] U.S. Cl. ....................................... 358/76; 358/80
[58] Field of Search ............................ 358/75, 76, 80

[56] References Cited

U.S. PATENT DOCUMENTS

| 4,205,337 | 5/1980 | Millward . |
| 4,310,847 | 1/1982 | Frohbach et al. . |
| 4,330,793 | 5/1982 | Stemme et al. . |
| 4,418,358 | 11/1983 | Poetsch et al. . |
| 4,630,120 | 12/1986 | Childs . |
| 4,656,525 | 4/1987 | Norris ................................ 358/76 X |
| 4,672,424 | 6/1987 | Lichner . |
| 4,703,365 | 10/1987 | Mumford . |
| 4,709,144 | 11/1987 | Vincent . |
| 4,716,456 | 12/1987 | Hosaka . |
| 4,736,251 | 4/1988 | Sasaoka . |
| 4,745,466 | 5/1988 | Yoshida et al. . |

FOREIGN PATENT DOCUMENTS

| 0145199 | 6/1985 | European Pat. Off. . |
| 0178938 | 4/1986 | European Pat. Off. . |
| 0185498 | 6/1986 | European Pat. Off. . |
| 0272634 | 6/1988 | European Pat. Off. . |
| 2114853 | 8/1983 | United Kingdom . |
| 2191061 | 12/1987 | United Kingdom . |

Primary Examiner—James J. Groody
Assistant Examiner—Mark R. Powell
Attorney, Agent, or Firm—David M. Woods

[57] ABSTRACT

A motion picture film scanner generates a high definition television signal from the combination of a high definition detail component and a plurality of lower definition color components. The detail component is obtained from a luminance signal generated by a linear array sensor having a line resolution suitable for high definition scanning. The lower definition color components are obtained from three low resolution linear array sensors producing unsharp red, green and blue signals. The luminance array is divided into like-sized segments; multiple registers are then used to reach the data rate required for high definition scanning. The color photosites are large than the luminance photosites for improved signal-to-noise performance. By further selecting the number of photosites in each luminance segment to be a submultiple of the number of photosites in a color array, a common clock signal is used to read out all the linear arrays. Plural lines of luminance are thus output for each line of color, thus yielding lower color resolution in the vertical as well as the horizontal scanning direction.

38 Claims, 4 Drawing Sheets

METHOD AND APPARATUS FOR GENERATING A HIGH DEFINITION ELECTRONIC SIGNAL FROM A LINE SCAN OF A COLOR ORIGINAL

BACKGROUND OF THE INVENTION

1. Technical Field

This invention pertains to the field of electronic image generation and, more particularly, to scanning apparatus for producing electronic picture signals from a color original and to signal processing techniques for use therewith.

2. Background Art

Although generally useful in the electronic imaging art, this invention has special application to a linear array film scanner used in a telecine machine for producing a television signal from a motion picture film. A linear array film scanner typically uses a light-sensitive linear charge-coupled device (CCD), which provides a serial output representing a line of a television raster. For color television, a film scanner usually includes an assembly of three separate CCD arrays, one each for red, green and blue. The film is driven at a uniform rate between the linear array assembly and a light source in a direction perpendicular to the linear dimension of the sensor arrays, and a beam splitting optical system images an illuminated section of film on each CCD array. The film motion provides the vertical (frame) scan and the linear cycling of the CCD arrays provides the horizontal (line) scan. Such a scanner is described in U.S. Pat. No. 4,205,337.

Instead of using separate linear devices, U.S. Pat. No. 4,736,251 discloses three CCD line sensors formed on a single solid state substrate. Because different illuminated sections of the film are imaged on the respective line sensors, the signals output from the sensors must be corrected by using shift registers or memory to obtain identical timing in the vertical direction. The '251 patent also discloses a CCD array incorporating four line sensors—three color sensors and a fourth line sensor for deriving a luminance signal. According to the patent disclosure, it is then possible to obtain a luminance signal having a higher resolution than that composed from the color signals, thereby allowing the capacity of memories for storing the color signals to be smaller than that for storing the luminance signal.

The extension of linear array techniques directly to high definition television, which requires more lines of much higher resolution than in conventional television, is difficult for several reasons. To begin with, existing arrays will not work fast enough to read out at the data rates required for high definition scanning. For example, a high definition frame of 1920 pixels/line for 1035 lines/frame requires a very high output data rate of at least 60 mHz—partly due to higher resolution in the horizontal (line) scanning direction and partly due to increased line scans in the vertical (frame) scanning direction. (Indeed, the data rate of 60 mHz would only be adequate if the full frame height could be used to provide data. In practice, because the high definition aspect ratio is 16:9 whereas the conventional motion picture film aspect ratio is 4:3, only about 62% of the film frame height is used. As a consequence, a much higher data rate of about 100 mHz or more is needed.) This problem can be addressed, albeit with additional complexity, by interleaving the output of the photosites to two or more output registers to lower the output clock frequency for a given data rate (which is useful in the line scanning direction, see U.S. Pat. No. 4,330,793) or by simultaneously scanning paired line sensors oriented to adjacent lines to double the number of lines for a given line rate (which is useful in the frame scanning direction, see published U.K. Patent Application GB 2191061).

More importantly, considering the very short linear scanning times involved in reaching the required resolution, the sensitivity of existing devices is not high enough to provide good signal-to-noise performance. Providing a plurality of output registers or paired sensors is a way of accommodating the shorter line times and higher data rates with a reachable clock frequency; by themselves, such techniques do nothing to increase sensitivity of the sensors. Thus a high definition film scanner operating linear arrays according to known techniques is plagued with a complex read-out architecture yielding a relatively inadequate signal-to-noise performance.

SUMMARY OF THE INVENTION

The invention departs from the prior art in several aspects. First, the desired high definition output signal is obtained from a high definition detail component and a plurality of lower definition color components. A luminance array produces a full resolution luminance signal including high definition detail, i.e., a signal meeting the requirements of the high definition standard in use. A plurality of color arrays produce a like plurality of lower definition color signals. The high definition output signal is obtained by combining high definition detail (extracted from the full resolution luminance signal) with the low resolution color signals, which are registered with the detail and interpolated both horizontally and vertically to match the high definition standard.

As the color arrays produce lower definition signals, the problem of a high read-out rate is restricted to the luminance array. The luminance array is divided into substantially like-sized segments and multiple registers are then used, one for each segment, to reach the data rate required for high definition scanning. Furthermore, by originating the detail separate from the color, a significant noise improvement can be obtained from the color arrays. Since each color signal is a lower definition, unsharp representation of an image in the horizontal (line) scanning direction, a larger photosensitive area is devoted to each photosite in the horizontal direction. In addition, by reading the color signal for every other line and thereby decreasing resolution in the vertical direction, the color photosites then can be larger in both dimensions in proportion to the ratio of the numbers of luminance to color photosites. For example, if there are twice as many luminance photosites as color photosites, the color photosites have linear dimensions twice those of the luminance photosites. Insofar as integration time is doubled (every other line scanned) for a quadrupled area (linear dimensions doubled), an eight-fold signal-to-noise improvement is realized.

Inasmuch as a larger light collection period (integration time) is possible with each color array, and these arrays are not read out on every line of the film scan, a single readout register for each color array provides an adequate rate for an achievable clock frequency. By additionally selecting the photosites in each color array to be an integral multiple of the photosites in a luminance segment, a common clock frequency can be used for driving all the output registers ... leading to a considerable simplification in the processing associated with the sensor assembly. With such a common clock, and, e.g., twice the photosites in each color array for the number in a luminance segment, two luminance lines are read out for each line of color, thereby directly providing lesser resolution in the vertical direction without the complexity of a different clocking scheme for that purpose.

BRIEF DESCRIPTION OF THE DRAWINGS

The invention will be described in relation to the drawings, in which.

MODE(S) FOR CARRYING OUT THE INVENTION

Figure 1:
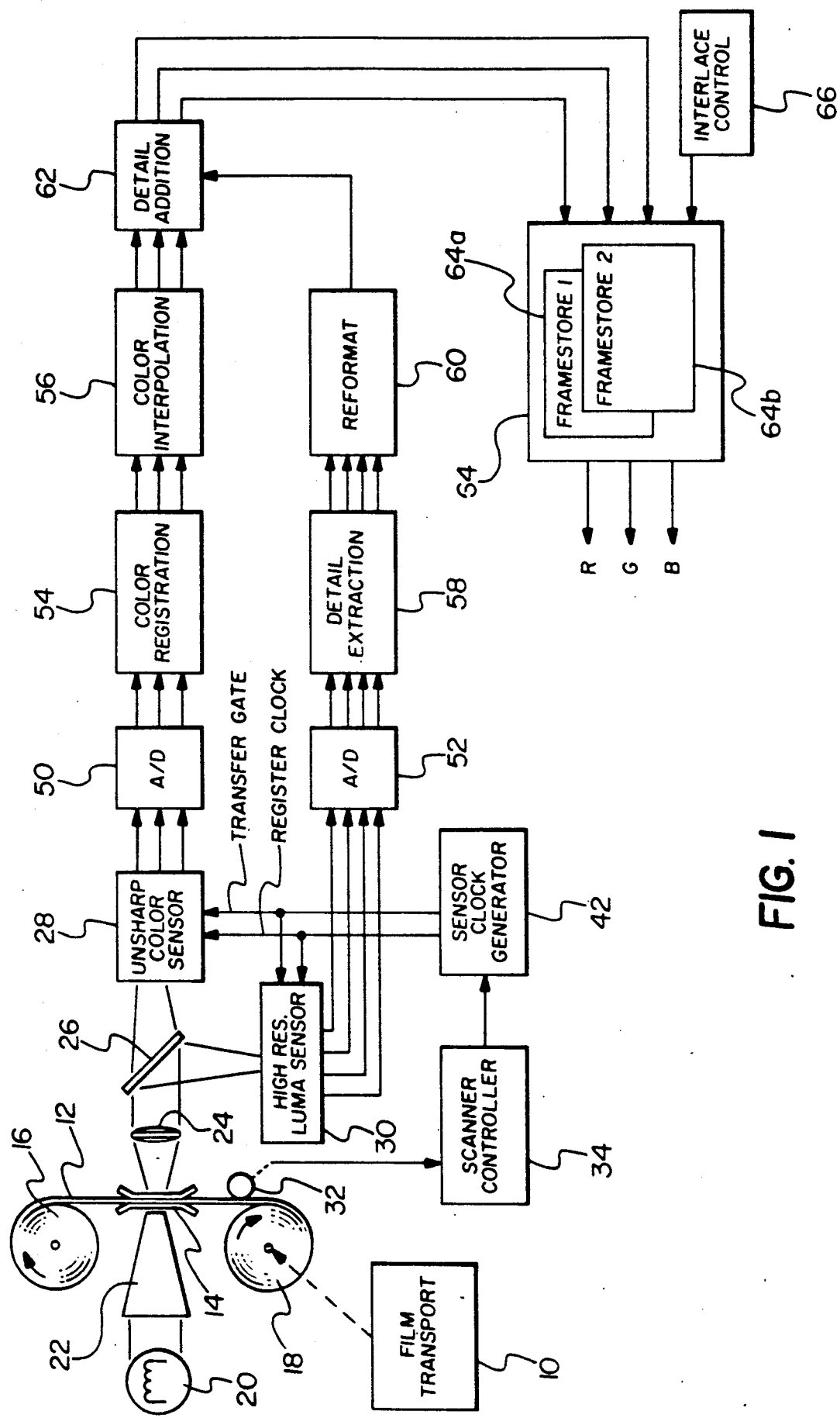
FIG. 1 is a block diagram of a film scanner for generating a high definition electronic signal according to the invention.

Referring first to FIG. 1, a film transport 10 advances a motion picture film 12 at a substantially uniform speed through a film gate 14 from a supply reel 16 to a take up reel 18. A light source 20 generates a light beam that is directed through a circle to line converter 22 and focussed upon a linear section of the film 12 in the film gate 14. The light is modulated by the image in the film 12 and transmitted through an objective lens 24 to a beam splitter 26, which transmits one portion of the modulated light to an unsharp color sensor 28 and reflects the other portion to a high resolution luminance sensor 30. A sprocket wheel 32 engages perforations in the motion picture film 12 to provide a scanner controller 34 with film speed information, particularly in relation to speed variations thereof.

The color sensor 28 comprises three color sensors respectively sensitive to red, green and blue light. The color sensor structure, which is better shown in FIG. 2, includes a red-sensitive linear CCD array 36r including photosites R1, R2, . . . , a green-sensitive linear CCD array 36g including photosites G1, G2, . . . , and a blue-sensitive linear CCD array 36b including photosites B1, B2, . . . . In this embodiment, each array 36r, 36g, 36b includes 960 active photosites. The spectral sensitization of the photosites is provided by linear color filter strips (not shown) applied to the sensor 28 and overlying the arrays 36r, 36g and 36b. Each linear array has associated therewith a respective transfer gate 38r, 38g, 38b separating each array from a respective output shift register 40r, 40g, 40b. Image charge accumulated in the charge wells of the respective arrays is transferred to the respective shift registers 40r, 40g, 40b by dropping the appropriate transfer gate 38r, 38g, 38b low. A sensor clock generator 42 (FIG. 1) provides an appropriate gating signal to the transfer gates 38r, 38g, 38b to effect charge transfer. In addition, the sensor clock generator 42 provides a clock signal of predetermined frequency for shifting the respective image signals from the output registers 40r, 40g, and 40b.

Figure 2:
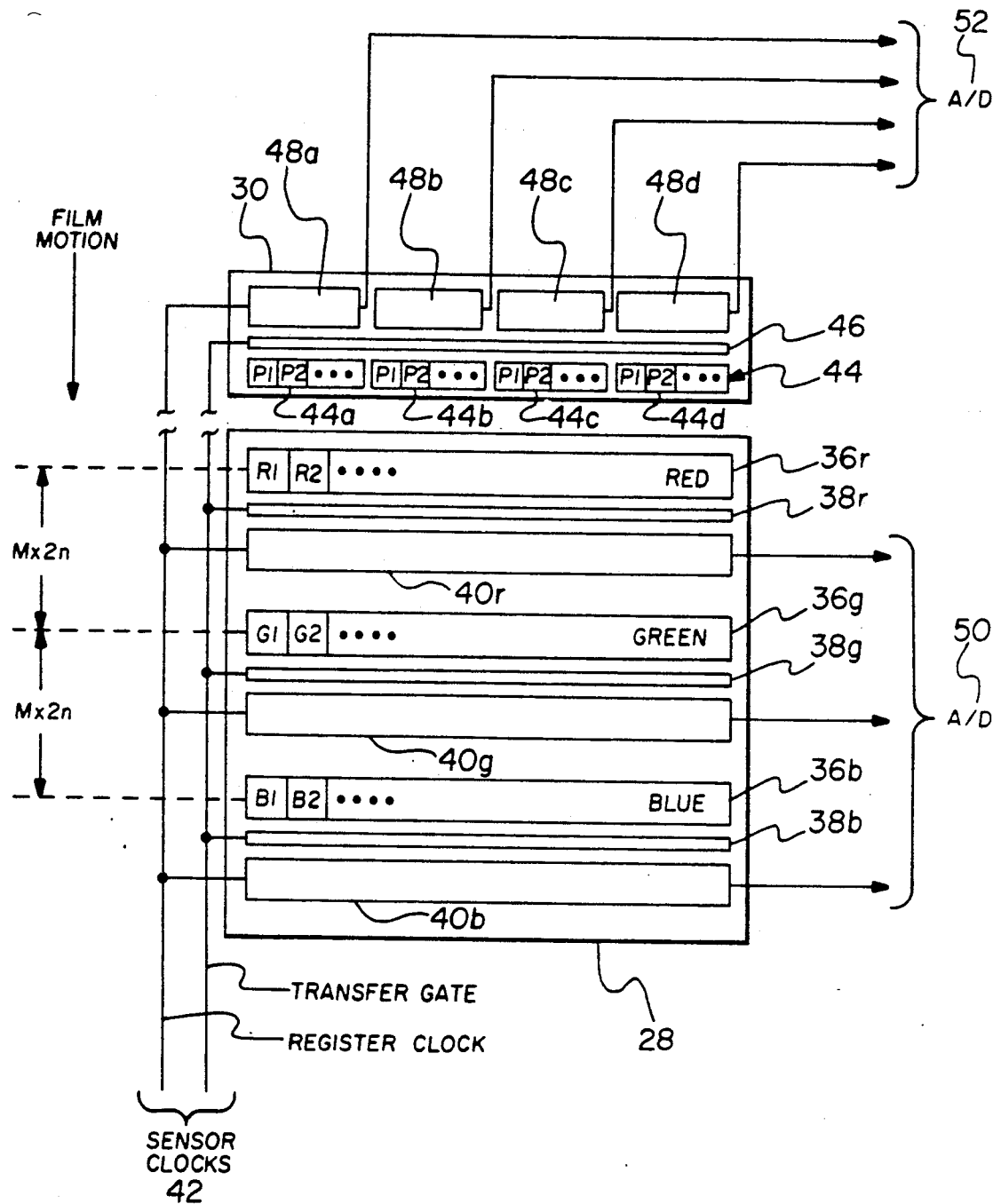
FIG. 2 is a detailed diagram of the unsharp color sensors and the high resolution luminance sensor shown in FIG. 1.

As further shown in FIG. 2, the luminance sensor 30 includes a linear array 44 sensitized to light having a spectral composition approximating a luminance function. In addition, the signal level from the high resolution luminance sensor 30 benefits from the wide spectral response of the luminance sensitivity function to which it is responsive. The linear array 44 produces a full resolution signal according to the requirements of the high definition standard in use, that is, the luminance array 44 includes a sufficient number of active photosites so as to correspond to the line resolution of the high definition standard. In this embodiment, the luminance array includes 1920 active photosites. As the clocking rate for such a large number of photosites poses a problem in relation to available output devices, the array 44 is divided into four like-sized segments 44a, 44b, 44c and 44d—each including a subset P1, P2, . . . of photosites; in this embodiment, there are 480 active photosites in each segment. A transfer gate 46, connected to the sensor clock generator 42, is juxtaposed between the segments 44a, 44b, 44c, 44d and a corresponding plurality of output shift registers 48a, 48b, 48c, 48d, which are also connected to the sensor clock generator 42. With such an architecture, the image charge in all photosites in the array 44 are simultaneously gated to the output registers 48a, 48b, 48c, 48d and simultaneously shifted therefrom at one-quarter the clock frequency ordinarily needed for the high definition data rate, i.e., the data output rate of the luminance sensor 30 is four times the clock frequency applied to the individual output registers 48a, 48b, 48c and 48d.

In the preferred embodiment, the film may run at a speed slightly in excess of 30 frames per second (actually, 31.5 f.p.s.), therefore suggesting a data rate of 120 mHz for the full high definition image. The sensor clock frequency for shifting the image signals from the output registers 40r, 40g, 40b, 48a, 48b, 48c, and 48d, consequently, is fixed at 30 mHz, i.e., one-quarter of the high definition data rate. The sensor clock generator 42, furthermore, is responsive to film speed variation via the scanner controller 34, accordingly varying the duration of a "dead period" at the end of each line to accommodate the change in line integration time needed if the film speed is varied. (The sensor clock frequency is therefore selected to accommodate the highest film speed that will be encountered.)

The sensors 28 and 30 are illustrated next to each other in FIG. 2 to emphasize the relative arrangement of the linear arrays 36r, 36g, 36b and 44. It is of particular note that the color and luminance sensors 28 and 30 cover substantially the same linear dimension, but with different resolution. Low resolution, or unsharp, color is provided from the color arrays 36r, 36g, 36b by fewer photosites (960) than for luminance (1920). This provides lower color resolution in the horizontal scanning direction and allows the color photosites to be accordingly larger, which has the advantageous affect of increasing the signal-to-noise performance. In addition, color resolution in the vertical scanning direction is reduced by scanning one line of color for every two lines of luminance, thereby allowing the vertical color dimension to be increased (doubled) in relation to the luminance photosites. The total area of the color photosites is accordingly four times that of the luminance photosites. Taking further into account that the integration time of each color photosite is twice that of a luminance photosite (because each color line is read out half as frequently), the signal from the color photosites realizes an eight-fold noise improvement.

The three color arrays 36r, 36g and 36b are offset from each other by an integral number of lines so that, at any instant, three separate lines from the film 12 are imaged on the sensor 28. With the color arrays collecting light over a two (high definition) line period for each color line read out, the color arrays are spaced by an integral multiple (m) of twice the high definition line spacing (2n). This is shown in FIG. 2. The luminance sensor 30 may be aligned to a fourth, separate line or, preferably, is aligned via the beam splitter 26 to one of the color lines, say the line imaged upon the green-sensitive array 36g. The horizontal (line) scan is provided by transferring image charge from the linear arrays to the output registers, and accordingly clocking the signals from the registers. The vertical (frame) scan is provided by the motion imparted to the film 12 by the film transport 10 (FIG. 1), and typically would allow for more than a thousand (say, 1035) lines in a frame.

A further advantage of the invention is obtained by structuring the luminance segments 44a, 44b, 44c, 44d relative to the color arrays 36r, 36g, 36b so that the number of photosites in a color array is an integral multiple of the number of photosites in a luminance segment. For the preferred embodiment shown in FIG. 2, each color array has twice as many photosites as a luminance segment; specifically, each color array 36r, 36g, 36b has 960 photosites in relation to 480 photosites for each luminance segment 44a, 44b, 44c, 44d. The luminance registers 48a, 48b, 48c, 48d are read in parallel once for each line while the color registers 40r, 40g, 40b are read in parallel once for every two lines of luminance. (Such a benefit is obtained when the number of photosites in each segment comprises a submultiple of the number of photosites in a color array, i.e., which is a special case of the "integral multiple" relationship.) Since there are twice as many photosites per register in color as in luminance and the color is read half as frequently, the numbers of photosites read per second is the same for color and luminance; consequently, only a single clock frequency is required to read out all of the registers 40r, 40g, 40b, 48a, 48b, 48c, 48d. A single clock frequency thus interrogates both color and luminance, providing both the necessary data rates and the desired vertical and horizontal resolution.

Referring again to FIG. 1, the unsharp color sensors 28 provide three channels of color data to an analog-to-digital (A/D) converter 50 and the luminance sensor 30 provides four channels of luminance data, one from each register 48a, 48b, 48c, 48d (FIG. 2), to another analog-to-digital (A/D) converter 52. Because the three color arrays 36r, 36g, 36b are spaced on the sensor 28 in the direction of film motion, the photosites being read at a given time correspond to different vertical locations on the film frame. This fixed mis-registration is corrected by a color registration circuit 54 shown in FIG. 1, which includes suitable line delays for registering the color lines with each other and with the luminance line. For instance, for film moving as shown in FIG. 2, a 2(m×2n) delay is imparted to the red signal from the register 40r, a (m×2n) delay is imparted to the green signal from the register 40g, and no delay is given to the blue signal. In addition, depending on the registration of the luminance line relative to the color lines, a line delay may be inserted into the luminance channel(s) to register the luminance lines with a selected color line.

Since the digital color values represent lower resolution data than the digital luminance values, additional color values are generated in a color interpolation circuit 56 in both the horizontal and vertical directions. Various conventional interpolation techniques will work. For example, the additional values for the extra high definition locations, which fall between the existing color values, may be a simple repeat of the existing color value before it in the horizontal direction and a repeat of the thus-interpolated line values in the vertical direction. Alternatively, the existing values can be averaged in the horizontal direction and then further averaged in the vertical direction. In either case, the number of color values are expanded to match the number of luminance values in a high definition line.

Meanwhile, high frequency detail is extracted from the four channels of luminance data by a detail extraction circuit 58, which includes an array of high pass filters (not shown). Various conventional filtering techniques can be used; for instance, the signal value of each photosite can be subtracted from an average of the neighboring photosites, either in one or two dimensions. This can be repeated for differently-sized neighborhoods to give a set of spatial frequencies representative of various levels of detail in the luminance signal. The signals in the four luminance channels are aligned "end-to-end" to correspond to a physical line in a reformat circuit 60, which may, for example, be a conventional multiplexer triggered in quarter-line sequence to output a continuous detail signal. In addition, depending on the orientation of the luminance line scan in relation to the color line scan, additional delay elements may be included prior to the reformat circuit 60 to register the detail signal with the registered color signals.

The detail is added to each channel of color in an addition circuit 62, forming thereafter a full resolution, high definition color output signal. This high definition output signal is applied to an image store 64, which includes a first framestore 64a and a second framestore 64b. Recalling now that the high definition signal to this point is a sequential signal, an interlace controller 66 loads a video frame sequentially into one framestore while extracting video fields (of a previously loaded frame) in interlace format from the other framestore. A digital red, green, blue high definition field signal is thus provided at the output of the image store 64 for further use, which may include immediate broadcast transmission or recording, e.g., on video tape (after suitable standards conversion or encoding, as necessary). In any event, such further use is not to be part of the present invention.

Figure 3:
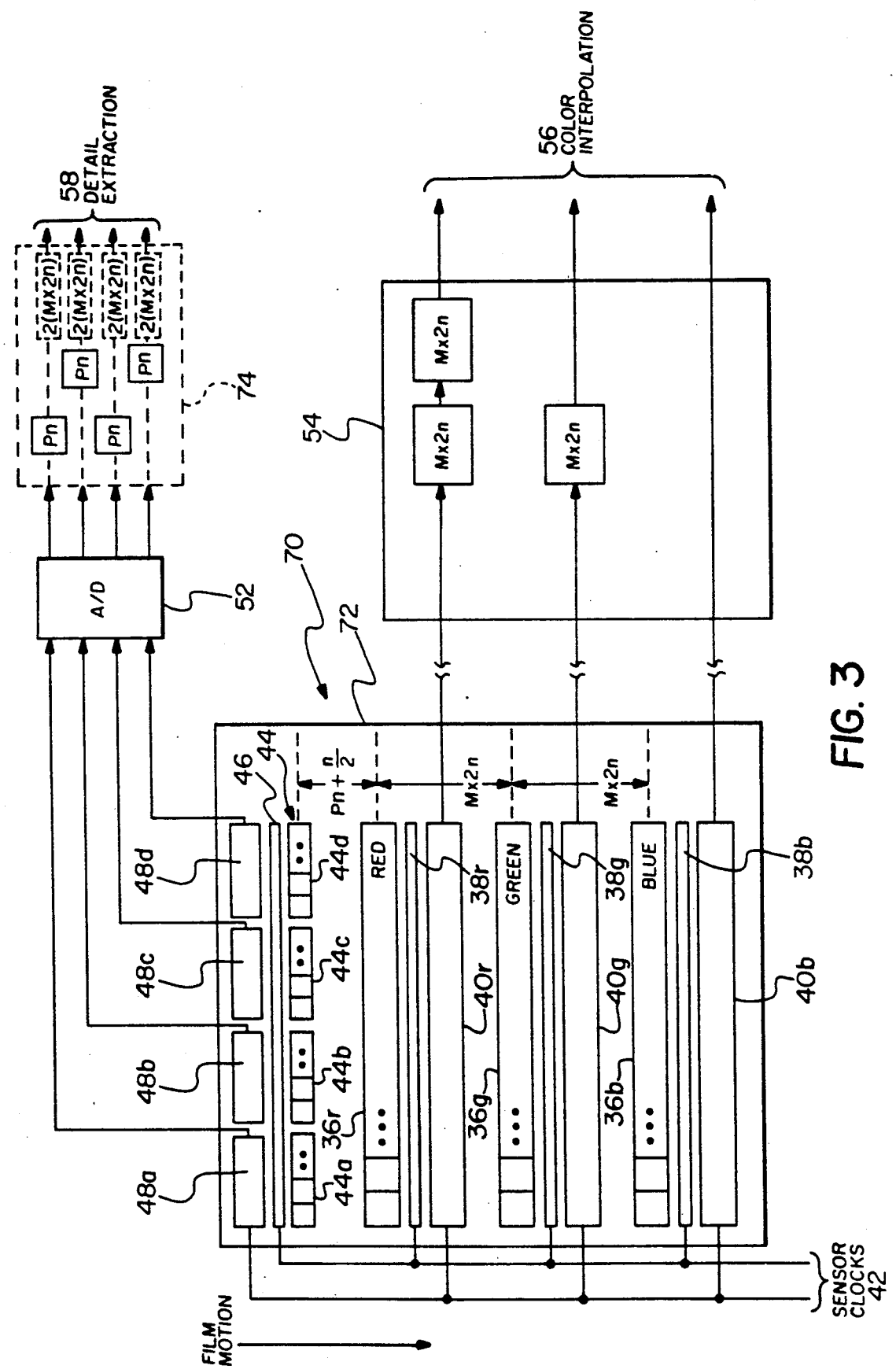
FIG. 3 is a detailed diagram of an alternative embodiment for the sensors shown in FIG. 2.
Figure 4A:
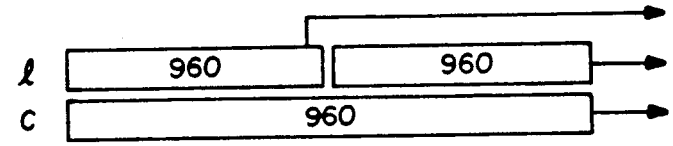
FIG. 4 (A-F) are several abbreviated views of the color and luminance sensors, showing in particular exemplary photosite arrays proportioned according to an aspect of the invention.
Figure 4B:
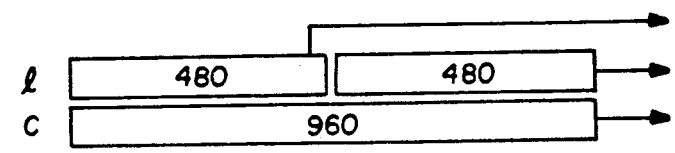
Figure 4C:
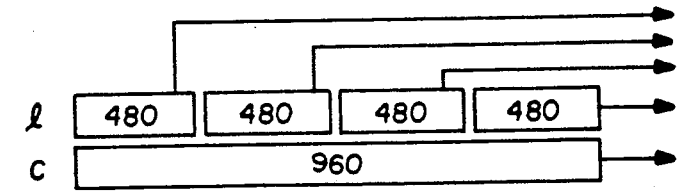
Figure 4D:
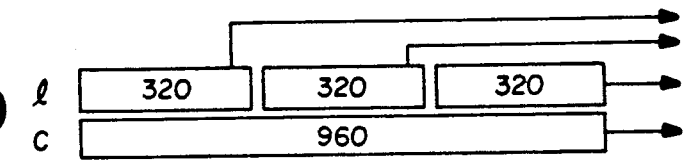
Figure 4E:
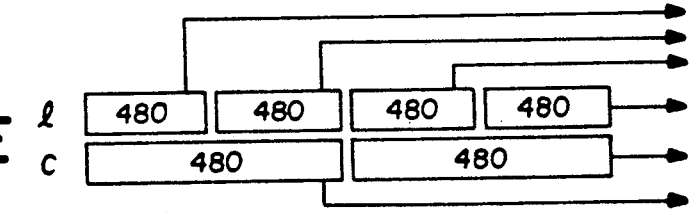
Figure 4F:
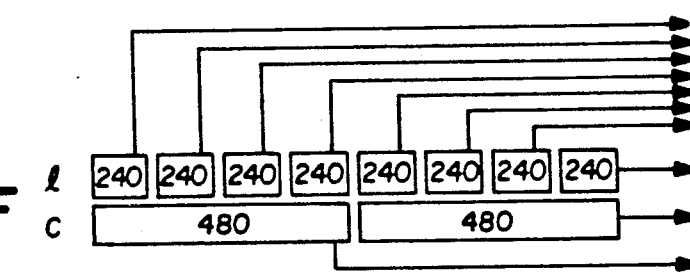

Instead of the separate luminance sensor 30 and color sensor 28 as shown in FIG. 2, an alternative architecture based on a quad-linear array 70 is shown in FIG. 3. Similar reference characters are used inasmuch as the linear arrays for color and luminance, the transfer gates and the output registers are basically the same for either embodiment. The difference in FIG. 3 is that all the sensor components are on one solid-state substrate 72. This configuration eliminates the beam splitter 26 in FIG. 1 and has each array—the luminance array 44 as well as the color arrays 36r, 36g and 36b—registered to a different vertical location on the film frame. The spacing of the luminance and color arrays is shown in FIG. 3 to be equivalent to (pn+n/2), where n is the high definition line spacing and p is an integer. As the color arrays 36r, 36g and 36b collect light over a two (high definition) line period and are read at half the rate as the luminance array 44, the half-line offset n/2 is needed to ensure that when luminance and color are read out the spacing between them is an integral number of luminance lines. The integer p provides additional luminance lines of spacing as determined by physical requirements in the integrated circuit chip design. As before, the color-to-color spacing is an integral multiple of twice the high definition line spacing. The color registration circuit 54 is shown with the necessary delays to correct the mis-registration of the color channels relative to the luminance channel. An additional delay block 74 is shown in the luminance channels to provide the delay required by the chip layout for the luminance array 44 to register with the last array scanned, that is, the blue color array 36b.

FIG. 4 shows a number of alternative sensor structures for the luminance (1) array and the color (c) array, which together utilize a common clock frequency in combination with multiple register readout (the numbers refer to an exemplary number of photosites in each segment). FIG. 4A illustrates multiple register readout of high resolution luminance in a structure that uses a double frequency clock (60 mHz) in comparison to the clock of the preferred embodiment (FIG. 4C). The arrangement of FIG. 4A provides for reading color on every line, albeit vertical color resolution (which is controlled by the pixel size) is still only half that of luminance. FIGS. 4B and 4D show the same horizontal resolution in color and luminance, instead using the segment approach and a common clock frequency to obtain lowered vertical resolution for color—one line of color for two lines of luminance in the case of FIG. 4B and one line of color for three lines of luminance in the case of FIG. 4D. FIG. 4E illustrates a segment approach in both luminance and color to allow a single clock (e.g., 30 mHz) to read out both the high resolution luminance and the unsharp color, but with the same vertical resolution as outlined in connection with FIG. 4A. FIG. 4F adds to the structure of FIG. 4E by further segmenting the luminance to additionally allow a yet lower clock frequency (e.g., 15 mHz) with continued unsharp vertical resolution in color . . . in this case, one line of color for every two lines of luminance. FIG. 4C is the preferred embodiment, as previously discussed and shown here for comparison. In each case the photosites in a color array are an integral multiple of the photosites in a luminance segment, that is, for these examples, an integral multiple of one (FIG. 4A, 4E), two (FIGS. 4B, 4C, 4F) and three (FIG. 4D). In some of these examples (for instance, FIGS. 4A and 4E) vertical color resolution is predominantly controlled by photosite size while in other examples (FIGS. 4B, 4C, 4D and 4F) it is controlled by the integration period. It is seen, moreover, that the term "color array" includes one of several color arrays so that, in FIGS. 4(E) and 4(F), the integral multiple comparison is between one color array (of two) and one luminance segment (of four, or eight, respectively).

While the invention has been disclosed for use with a telecine machine that generates a television picture signal from a motion picture film, it is intended that the disclosed film scanner could be used with other types of electronic imaging machines. One example is a color copier, which also may be used to illustrate a number of modifications that are included within the concept of the invention. For example, rather than moving a color original past the linear arrays, the color copier may instead provide means, such as an oscillating mirror, for moving the scanning beam relative to the linear array (i.e., both the original and the sensors are stationary). Alternatively, the linear arrays can be designed to move across the original. Moreover, the image modulation imparted to the scanning beam can originate from transmission through the original or reflection from the original. Finally, while digital processing is preferred, the concepts of the invention can be implemented in a wholly, or partially, analog processing system.

The invention has been described in detail with particular reference to a presently preferred embodiment, but it will be understood that variations and modifications can be effected within the spirit and scope of the invention.

What is claimed is:

1. Apparatus for generating a high definition electrode signal corresponding to a predetermined line resolution by scanning a color original, said apparatus comprising:

means for generating a high definition detail signal, said detail signal generating means including high definition scanning means having a linear structure of high definition photosites that substantially provide the predetermined line resolution;

means for generating an unsharp color signal of lesser resolution than the predetermined line resolution, said unsharp signal generating means including color scanning means having a linear structure of color photosites that are individually larger than the high definition photosites;

means for operating said high definition scanning means and said color scanning means at a common frame rate; and means for combining the high definition detail signal with the unsharp color signal to form the high definition electronic signal, whereby the larger size of the color photosites improves the signal-to-noise performance of the apparatus.

2. Apparatus as claimed in claim 1 wherein said high definition scanning means is spectrally sensitized to approximate a luminance function, thereby producing a luminance signal.

3. Apparatus as claimed in claim 2 wherein said detail signal generating means includes means for extracting the detail signal from the luminance signal.

4. Apparatus as claimed in claim 2 wherein said high definition scanning means comprises a linear array of photosites divided into a plurality of substantially like-sized segments.

5. Apparatus as claimed in claim 4 wherein the number of color photosites in said linear structure thereof substantially corresponds to an integral multiple of the number of photosites in each of said segments.

6. Apparatus as claimed in claim 5 wherein said integral multiple is two.

7. Apparatus as claimed in claim 4 wherein said detail signal generating means includes an output register associated with each segment for receiving the luminance signal and means for simultaneously clocking the luminance signal from each output register.

8. Apparatus as claimed in claim 7 wherein said unsharp signal generating means includes an output register coupled to said color photosites for receiving the unsharp color signal, said color photosites substantially corresponding in number to an integral multiple of the number of photosites in a segment.

9. Apparatus as claimed in claim 8 wherein said apparatus includes a pulse generator for generating a clock signal and means for applying the clock signal to the color output register and to each of the luminance registers, whereby the luminance signal is obtained from the combination of the segments at a greater data rate than the color signal from the color linear arrays.

10. Apparatus as claimed in claim 1 wherein said color scanning means comprises three linear arrays of photosites respectively sensitized to red, green and blue.

11. Apparatus for line scanning a color original and generating a color signal from a color line sensor and a luminance signal from a luminance line sensor, characterized in that:

said luminance line sensor includes a linear array of luminance-receptive photosites divided into a plurality of substantially like-sized linear segments and said color line sensor includes a linear array of color-receptive photosites substantially corresponding in number to an integral multiple of the number of luminance photosites in a luminance segment, whereby, for a common clock rate, the luminance signal may be obtained from the combination of the linear segments at a greater data rate than a color signal from the color linear array.

12. Apparatus as claimed in claim 11 wherein each color linear array contains an integral multiple of two or more times the number of photosites in a luminance segment, thereby providing multiple lines of luminance for each line of color.

13. Apparatus as claimed in claim 11 wherein the color linear array is provided with fewer photosites, and therefore with lower resolution, than the sum of the photosites in the linear segments comprising the luminance linear array.

14. Apparatus as claimed in claim 13 wherein the photosites comprising the color linear array are individually larger than the photosites comprising the luminance linear array.

15. Apparatus as claimed in claim 14 wherein the photosites comprising the color linear array are larger than the luminance photosites in proportion to the number of luminance photosites in the luminance linear array to the number of color photosites in the color linear array.

16. Apparatus as claimed in claim 15 in which the color photosites have vertical and horizontal dimensions both larger than like dimensions of said luminance photosites.

17. Apparatus as claimed in claim 11 wherein said color line sensor comprises two or more color arrays formed on a common substrate separate from said luminance line sensor.

18. Color image sensing apparatus having at least one color line sensor for generating a color signal and a luminance line sensor for generating a luminance signal, said sensing apparatus used with a pulse generating means for generating a clock signal for scanning the sensors in a horizontal scanning direction and means for moving the color image relative to the line sensors to effect vertical scanning orthogonal to the horizontal scanning direction, characterized in that:

said color line sensor includes a linear array of color-receptive photosites and said luminance line sensor includes a linear array of luminance-receptive photosites divided into a plurality of substantially like-sized linear segments, each segment comprising a submultiple of the number of the photosites in the color linear array so that, for a common clock signal, a plurality of lines of the luminance signal is obtained from the combination of the linear segments for each line of the color signal, thereby providing decreased color resolution relative to luminance resolution in the vertical scanning direction.

19. Color image sensing apparatus as claimed in claim 18 wherein the linear segments of the luminance array have, in combination, more photosites than the color linear array, thereby providing decreased color resolution relative to luminance resolution in the horizontal scanning direction.

20. Color image sensing apparatus as claimed in claim 19 wherein the color photosites are larger than the luminance photosites.

21. Color image sensing apparatus as claimed in claim 20 wherein the color photosites are larger in proportion to the ratio of the number of luminance photosites in the combination of linear segments to the number of color photosites.

22. High definition scanning and processing apparatus for scanning a color original and generating a plurality of high definition color signals, said apparatus comprising:

a plurality of line sensors, including a high definition sensor having a linear array of photosites providing a horizontal resolution corresponding to a predetermined high definition resolution and a plurality of color sensors having respective linear arrays of photosites providing lower horizontal resolution than said predetermined resolution;

pulse generating means for generating a clock signal;

means for applying the clock signal to the line sensors to generate a high definition image signal and a plurality of lower definition color signals;

means for interpolating additional color signals from the lower definition color signals so that the combination of the lower definition color signals and the additional color signals form interpolated color signals corresponding in number of color values to the predetermined high definition resolution;

means for extracting a detail signal from the high definition image signal; and means for generating a plurality of high definition color signals by combining the detail signal with the plurality of interpolated color signals.

23. Apparatus as claimed in claim 22 wherein at least some of said line sensors are registered to different lines of the color original, said apparatus including means for correcting the different registrations of the line sensors so that the plurality of lower definition color signals are aligned with the high definition image signal.

24. A method for generating a high definition electronic signal by separately scanning a color original for high definition detail and for color, said method comprising the steps of:

generating a high definition signal from a high definition array of photosites corresponding in number to a high definition resolution standard;

generating an unsharp color signal from a lower resolution array comprising fewer photosites than for the high definition array;

operating said high definition array and said lower definition array at a common frame rate;

generating an expanded definition color signal to match the high definition signal by interpolating additional signal values for the unsharp color signal;

extracting high definition detail from the high definition signal; and combining the expanded definition color signal and the detail signal to form the high definition electronic signal.

25. A method as claimed in claim 24 in which said high definition array is divided into a plurality of like-sized segments and said step of generating a high definition signal comprises simultaneously applying a clock signal to each segment to generate a multi-channel high definition signal requiring a relatively lower clock rate than would be required for the data rate of the high definition signal.

26. A method as claimed in claim 25 in which the number of photosites in each segment is a submultiple of the photosites in the lower resolution color array and said step of generating an unsharp color signal comprises applying the same clock signal to the lower resolution array, whereby multiple lines of high definition detail are output for each line of color.

27. A method for generating a high definition electronic signal by linear scanning of a color original, said method comprising the steps of:
generating a clock signal;
generating a high definition image in a linear array of photosites corresponding to a high definition standard;
generating a color image in a linear array of photosites having fewer photosites than the high definition array;
applying the clock signal to like-sized segments of the high definition array to generate a multi-channel high definition signal;
applying the clock signal to the color linear array to generate an unsharp color signal;
producing an expanded definition color signal by interpolating additional color image values for image locations corresponding to the additional high definition photosites;
extracting a high definition detail signal from the multi-channel high definition signal; and
generating the high definition electronic signal from the combination of the high definition detail signal and the expanded definition color signal.

28. A method as claimed in claim 27 in which the color linear array comprises separate red, green and blue arrays oriented to separate lines of the color original and said method further includes the step of registering the separate red, green and blue signals to the multi-channel high definition signal.

29. Apparatus for generating a high definition electronic signal corresponding to a predetermined line resolution by scanning a color original, said apparatus comprising:
means for generating a high definition detail signal, said detail signal generating means including high definition scanning means having a linear structure of high definition photosites that substantially provide the predetermined line resolution;
means for generating an unsharp color signal of lesser resolution than the predetermined line resolution, said unsharp signal generating means including a plurality of color linear arrays respectively sensitized to a plurality of colors and oriented to separate lines of the color original, each of said linear arrays producing a color signal from a linear structure of color photosites that are individually larger than the high definition photosites;
means for operating said high definition scanning means and said color linear arrays at a common frame rate; and
means for combining the high definition detail signal with the unsharp color signal to form the high definition electronic signal, whereby the larger size of the color photosites improves the signal-to-noise performance of the apparatus.

30. Apparatus as claimed in claim 29 wherein said unsharp color signal generating means includes means for registering said plurality of color signals to the line producing said high definition detail signal.

31. Apparatus as claimed in claim 30 wherein said unsharp color signal generating means includes means for interpolating additional color signal values so as to match the additional high definition photosite locations in the high definition detail signal.

32. Apparatus as claimed in claim 31 wherein said plurality of color linear arrays comprise three linear arrays that are respectively sensitized to red, green, and blue.

33. Apparatus for line scanning a color original and generating a color signal from a color line sensor and a luminance signal from a luminance line sensor, characterized in that:
said luminance line sensor includes a linear array of luminance-receptive photosites divided into a plurality of substantially like-sized linear segments and said color line sensor includes two or more color linear arrays formed with said luminance line sensor on a common substrate, each of said color linear arrays formed of color-receptive photosites substantially corresponding in number to an integral multiple of the number of luminance photosites in a luminance segment, whereby, for a common clock rate, the luminance signal may be obtained from the combination of the linear segments at a greater data rate than a color signal from the color linear array.

34. Apparatus as claimed in claim 33 wherein each color linear array contains an integral multiple of two or more times the number of photosites in a luminance segment, thereby providing multiple lines of luminance for each line of color.

35. Apparatus as claimed in claim 33 wherein each color linear array is provided with fewer photosites, and therefore with lower resolution, than the sum of the photosites in the linear segments comprising the luminance linear array.

36. Apparatus as claimed in claim 35 wherein the photosites comprising each color linear array are individually larger than the photosites comprising the luminance linear array.

37. Apparatus as claimed in claim 36 wherein the photosites comprising each color linear array are larger than the luminance photosites in proportion to the number of luminance photosites in the luminance linear array to the number of color photosites in a color linear array.

38. Apparatus as claimed in claim 37 in which the color photosites have vertical and horizontal dimensions both larger than like dimensions of said luminance photosites.

* * * * *